United States Patent [19]
Mattson

[11] 4,446,093
[45] May 1, 1984

[54] "PIGGYBACK" HEAT EXCHANGER FOR DOME PRESSES

[75] Inventor: William F. Mattson, Hinckley, Ohio

[73] Assignee: The B. F. Goodrich Company, Akron, Ohio

[21] Appl. No.: 519,159

[22] Filed: Aug. 1, 1983

[51] Int. Cl.³ .............................................. B29H 5/02
[52] U.S. Cl. .................................. 264/315; 425/28 R; 425/40; 425/33
[58] Field of Search ................... 425/17, 19, 25, 28 R, 425/33, 40, 35; 264/315

[56] References Cited
U.S. PATENT DOCUMENTS

| | | | |
|---|---|---|---|
| 943,055 | 12/1909 | Williams | 425/40 |
| 2,111,233 | 3/1938 | Zangl | 425/40 |
| 2,358,762 | 9/1944 | Soderquist | 425/40 X |
| 2,358,764 | 9/1944 | Soderquist | 425/33 |
| 2,736,060 | 2/1956 | Glynn | 425/25 |
| 2,743,480 | 5/1956 | Frank | 425/33 |
| 2,775,789 | 1/1957 | Soderquist | 425/33 |
| 2,808,618 | 10/1957 | Soderquist | 425/33 |
| 2,848,740 | 8/1958 | Frohlich et al. | 425/33 |
| 3,029,469 | 4/1962 | Moore et al. | 425/33 |
| 3,071,811 | 1/1963 | Herbert | 425/33 |
| 3,241,190 | 3/1966 | Laudisa | 425/25 |
| 3,779,832 | 12/1973 | Reppel | 425/19 X |
| 3,853,666 | 12/1974 | Barefoot | 425/17 X |
| 3,854,852 | 12/1974 | Carter | 425/28 R X |
| 3,976,409 | 8/1976 | Athey | 425/33 X |

Primary Examiner—J. Howard Flint, Jr.
Attorney, Agent, or Firm—Vincent A. Greene; Alfred D. Lobo; Harry F. Pepper, Jr.

[57] ABSTRACT

A simple inexpensive modification of existing tire molds used in old steam dome vulcanizing presses provides remarkable versatility and permits curing of truck and farm tractor tires at higher temperatures with higher internal water pressures to reduce curing times 5 to 10% or more while improving tire quality. A thin, flat heat exchanger with outstanding heat transfer characteristics is readily provided on each mold half by welding a flat outer disc and spacers to the mold to form an annular steam chamber of narrow cross section in direct communication with the outer mold face and the vent passages.

5 Claims, 5 Drawing Figures

"PIGGYBACK" HEAT EXCHANGER FOR DOME PRESSES

BACKGROUND OF THE INVENTION

This invention relates to improvements in a tire molding apparatus used in a shaping and vulcanizing press and more particularly to a unique steam-chambered tire mold for use in standard steam dome presses.

For more than three decades, major tire manufacturers have employed presses, such as those sold under the name "Bag-O-Matic" (McNeil) or "Autoform" (NRM) which combine shaping and vulcanization of a previously formed pneumatic tire in one operation in accordance with the so-called Soderquist system. Presses of this type are disclosed, for example in U.S. Pat. Nos. 2,358,762; 2,358,764; 2,775,789 and 2,808,618. The heat for curing may be provided internally from the curing bladder or diaphragm and externally from a steam dome or steam-heated platens.

In a typical steam dome press, such as that of U.S. Pat. No. 2,358,762 or U.S. Pat. No. 2,775,789, the curing bladder or diaphragm is collapsed to permit a green tire to be positioned on the lower mold section, the press is then closed and the curing bag bladder expanded by steam forcing the tire into the mold. During the curing period, high pressure steam or high temperature water is provided in the curing bladder until the cure is completed. The length of the curing cycle depends on the size or mass of the tire being cured and may be from about 30 to 90 minutes (min) for a heavy duty truck tire. At the completion of the cure, the press automatically opens. The curing bladder may be completely extended mechanically and collapsed by application of vacuum to permit removal of the tire from the mold.

The steam dome presses built thirty years ago were designed to provide curing temperatures and pressures which were then considered optimal. The presses could operate with dome steam pressures up to 75 pounds per square inch gage ("psig"). These older presses must be operated using limited internal steam or water pressures typically in the range from about 200 to 250 psig. More recently modern shaping and vulcanizing presses have been designed to operate at much higher pressures and higher curing temperatures. The internal water pressures have been increased to 350–400 psig or higher to improve the quality of the tires, and higher curing temperatures have been employed to shorten the curing time.

Unfortunately the old steam dome presses cannot operate safely in such manner. Many of these presses were originally designed for operation at pressures of 75 psig and are today operated at dome pressures of around 70 psig which corresponds to a steam temperature of less than 160° C. The deterioration of the old presses requires lowering of the maximum steam pressure within the dome and also limits the internal water or steam pressure as both contribute to press-opening force. The internal water or steam pressure in the curing bladder must, for safety reasons, be less than the pressure desired for optimum tire quality.

Pressure vessel safety regulations on many standard steam dome presses prevent use of dome steam pressures substantially in excess of 75 psig and make it impossible to employ the high curing temperatures which are preferred for commercial production. The longer curing time substantially increases the cost of manufacture of the tires.

Steam dome presses have other disadvantages. They are energy inefficient because of leakage problems, the large mass being heated, and the large quantities of dome steam lost each time the press is opened. Also, because of the large mass being heated, temperature response is slow, making it nearly impossible to tailor temperature gradients or to profile the external mold temperature during the cure cycle. These and the other disadvantages described above have been recognized in the tire industry for decades, but the old steam dome presses have been retained in spite of their limitations particularly because of the high cost of new equipment.

The domes of old steam dome presses are similar to those of standard platen presses (see U.S. Pat. No. 2,808,618), and platens can be added to such steam dome presses. However, conversion of the old presses to platen presses is expensive and not a satisfactory solution to the above problem of slow temperature response. The old steam dome presses are desirable for curing some large tires where lower curing temperatures are required and where it is important to provide uniform heat to the outer circumferential portions of the tire mold (i.e. molds having a wide tread). Platen presses are less desirable because the heat comes solely from the top and bottom of the mold and because the heat transfer across the metal-to-metal interface is often uneven. These are some of the reasons why almost all large or heavy duty tires for trucks, tractors and heavy construction vehicles are cured in steam dome presses rather than platen presses. Tire manufacturers prefer to keep their old steam dome presses and to add newer ones which are rated at pressures up to 100 psig.

Unfortunately the high cost of modern steam dome presses limits their number and they have serious limitations. Pressure vessel safety regulations prevent operation of such presses at steam pressures in excess of 100 psig and therefore prevent use of steam temperatures in excess of 170° C. This places serious limitations on the cure time cycle reductions.

The rubber tire industry has had to rely heavily on its old equipment for manufacture of heavy duty truck tires and other large tires. Prior to the present invention tire manufacturers did not know how to make full utilization of the existing steam dome presses or how to overcome the temperature and pressure limitations dictated by pressure vessel safety regulations and slow mold temperature response to externally applied temperature conditions.

SUMMARY OF THE INVENTION

The present invention recognizes the limitations and advantages of old steam dome presses and provides a simple and remarkably effective way to improve the performance of such presses and their versatility. The invention makes it possible to improve the quality of tires cured in steam dome presses and also to reduce the cost of manufacture.

The invention involves the provision of piggyback heat exchangers on the upper and lower mold sections of an existing tire mold and operation of the steam dome press with or without dome steam. Gases from the mold cavity of the tire mold are vented into the steam chambers of the heat exchangers. Each heat exchanger can be made by welding a circular flat plate to the mold with spacers between the plate and the external mold surface to provide a narrow steam chamber (see FIG. 2). This arrangement minimizes the increase in the overall mold height and allows the steam to be in direct contact with the external mold surface. This design also minimizes the mass thermally coupled to the mold, allowing profiled external temperatures.

The modified tire molds of this invention make it possible to increase the external curing temperature substantially (i.e., 10° to 20° C. or more) and to effect significant reduction in cure times without significant reduction in the quality of the tires. Modern rubber tire compounds make it possible to obtain the desired high quality in large heavy equipment tires with higher curing temperatures in the range from about 165° C. to about 175° C., and with shorter curing times. The present invention significantly lowers the cost of manufacture of the heavy duty tires by reducing the curing time from 5% to 10% or more, yet maintaining the high quality of the tires. Additional savings result by elimination of gasket leaks and loss of dome steam each time the press is opened.

A 10 to 20 percent increase in the internal water pressure during the cure cycle is possible due to elimination of dome steam and will also result in a significant improvement in the quality of the tires produced in the dome press. In some cases, the present invention will make it possible to employ internal water pressures of 300 psig or substantially higher, depending on the condition of the particular dome press.

In a preferred embodiment of the invention, when using a steam dome press and a vented tire mold with piggyback heat exchangers as described hereinabove, the green tire is placed between the mold halves, the mold is closed, and the tire in the mold cavity is expanded by the curing bladder against the shaping surfaces of the mold to force air from the mold cavity through the vent passages to the steam chambers of the heat exchangers, and to extrude the rubber into the vent passages. The tire is heated by the residual heat of the mold for from about 1 to 6 min to cure the rubber in the vents,, at least partially, and high pressure steam is thereafter admitted to the steam chambers of the piggyback heat exchangers to heat the mold to a suitable curing temperature, such as in the range from 165° C. to 175° C. Internal heat is preferably supplied by heated water within the curing bladder at a high pressure in the range from about 300 to about 350 psig or more, depending upon the strength limitations of the press.

The modified tire molds of the present invention may be used with or without dome steam. In most cases the dome steam is eliminated to permit use of higher internal steam or water pressure in the curing bladder. However, when curing tires with wide treads, for example, dome steam may be employed to help heat the radially outer portions of the tire mold at the tread region. The modified tire molds provide versatility and permit use of various procedures during curing of the tire which could not previously be employed. These molds are particularly useful for curing at temperatures substantially above 160° C. but can also be used at lower temperatures.

A significant advantage of the modified tire molds of this invention is the ability to change the mold temperature rapidly during the curing cycle, which is not possible in a steam dome press. The quality of tires can be significantly improved by changing the mold temperature at various times during curing in the mold in an attempt to approach the ideal profiled heating curve. This can be done when using the unique heat exchangers of this invention in a steam dome press. On the other hand, platen presses are not suitable for this purpose because they are thermally coupled to a large mass which prevents rapid temperature change. The standard procedure is to supply steam continuously to the platen press to maintain the platens at the same temperature.

An object of the present invention is to modify existing tire molds for large or heavy duty tires so that they can be cured in steam dome presses with higher external temperatures, variable temperatures, and/or higher internal water or steam pressures.

Another object of the invention is to reduce the cost of pneumatic rubber tires cured in steam dome presses by materially reducing the curing time.

Other objects of the invention are to improve the versatility and energy efficiency of existing steam dome presses and to improve the quality of tires cured in such presses.

BRIEF DESCRIPTION OF THE DRAWINGS

The foregoing and other objects and advantages of my invention will appear more fully from the following description, made in connection with the accompanying drawings of preferred embodiments of the invention, wherein like reference characters refer to the same or similar parts throughout the several views and in which.

DETAILED DESCRIPTION OF THE PREFERRED EMBODIMENTS

Figure 1:
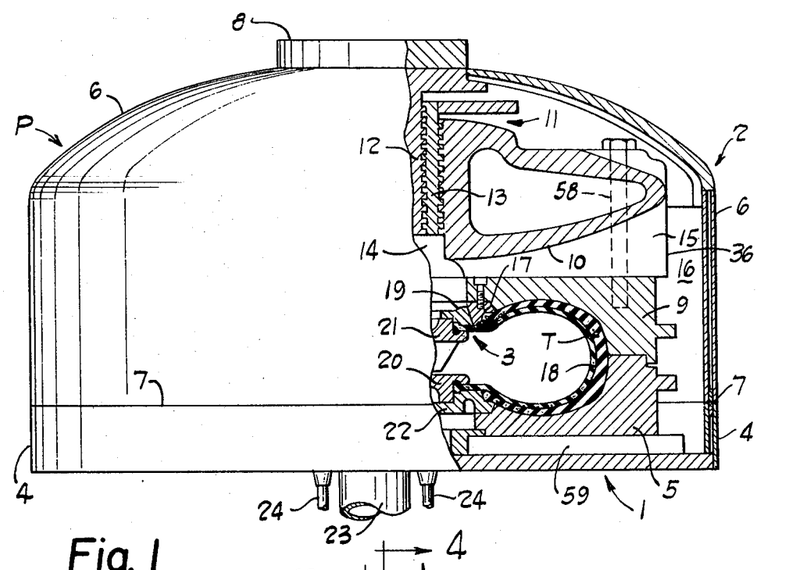
FIG. 1 is a partial side elevation broken away and shown in section illustrating a conventional steam-dome-type combined shaping and curing press in the closed position.

Referring more particularly to the drawings, FIG. 1 shows a conventional shaping and curing press P of the well known steam-dome type which may be similar to that shown and described in U.S. Pat. Nos. 2,358,762; 2,775,789 and 3,170,191 or that sold commercially under the trademark "Bag-O-Matic." Presses of this type have been used extensively by major tire manufacturers for several decades. Consequently, a brief description of the main elements is sufficient for an understanding of the operation and there is no need to describe in detail those elements having no particular bearing on the instant inventive improvements.

The press P comprises three main assemblies, the fixed press bottom assembly 1 at the bed of the press, the movable top assembly 2, and the diaphragm assembly 3 substantially as shown and described in U.S. Pat. No. 3,170,191. The fixed bottom assembly 1 includes a lower casing 4 and a lower mold half 5, and the movable top assembly 2 includes an upper casing or steam dome 6 which forms a tight seal with the lower casing at 7 when the press P is closed. The dome 6 is welded to or otherwise fixedly attached to and supported by the cross head or dome plate 8 which also supports all of the elements of the top assembly 2 located within the steam dome 6. The dome plate 8 is rigidly attached to conventional operating mechanism, not shown, for raising, lowering and tilting the entire top assembly 2 of the press P. Such operating mechanism may, for example, be the type disclosed in various patents of L. E. Soderquist, such as U.S. Pat. Nos. 2,358,762; 2,495,663 or 2,495,664.

The upper mold half 9 is bolted to or otherwise fixedly connected to a webbed support member or bolster 10 which is adjustably supported on the dome plate 8 by means of a double-screw-threaded support 11 including a threaded annular central support 12 and an annular intermediate member 13 having its inner and outer surfaces threaded in opposite hands to mate with the threaded outer surface of the support 12 and the threaded inner surface of the bolster 10. The central chamber 14 of the top assembly 2 as defined by the central support 12 and associated parts communicates through openings 15 with the outer chamber 16 defined by the dome 6, the lower casing 4 and the interior components of the press.

A top bead positioning ring 17 is bolted to or otherwise fixedly attached to the upper mold half 9 and serves to engage and position the upper bead region of the tire carcass to be shaped and cured.

The diaphragm assembly 3 comprises a curing bladder or diaphragm 18 whose upper and lower edge portions are gripped by the top and bottom diaphragm clamping rings 19 and 20 and the top and bottom bead positioning rings 21 and 22 as indicated in FIG. 1. The various components of the diaphragm assembly 3 are all supported in known manner from a central shaft assembly 23 or other conventional means as disclosed, for example, in U.S. Pat. No. 2,775,789 or other patents of L. E. Soderquist. The details of construction and operation have been well known in the art for decades in connection with "Bag-O-Matic" shaping and curing presses.

In normal operation of the press P, after a tire carcass T has been shaped into the toroidal form shown in FIG. 1 and the top assembly 2 has been completely closed upon and sealed with the bottom assembly 1, steam is admitted by conduit means (not shown) to fill the chambers 14 and 16 and heat the mold halves 5 and 9 and all other interior elements of the press. Steam and/or heated water is admitted to the interior of the curing bladder 18 by conduit means 24.

A typical older steam dome press may have sufficient strength for safe dome operation using steam pressures of 70 to 75 psi gage in chamber 16 and internal water pressures of 200 to 250 psi gage in the curing bags. However substantial increases in the dome steam pressure or the internal water pressures present a serious safety problem. In a steam dome press, such as the press P of FIG. 1, the forces tending to separate the lower and upper casings 4 and 6 include the upward force on the steam dome due to the steam pressure inside the dome plus the force exerted by the pressure of the heated water in the curing bladder 18. For example, a typical 30-year-old steam dome press cannot safely handle internal water pressures in excess of 300 psig when the steam pressure in chamber 16 is 75 psi gage. Some of the older steam dome presses are unsafe with internal water pressures of only 200 psi.

In the practice of the present invention the heating system used for curing the tire in a dome-type press is changed radically by using heat exchangers H integrally mounted on a conventional tire mold.

FIGS. 2 to 5 illustrate a tire mold 25 designed for use in a steam-dome press for shaping and curing a pneumatic tire. Such a mold comprises upper and lower mold halves 26 and 27 which fit together at the parting line 28 when the mold is closed. A near perfect fit may be provided, if desired, to provide a substantially airtight connection. The outer peripheral portion 29 of the upper mold half 26 has a downwardly projecting portion 30 for locating the mold halves which portion may be of annular shape. The outer peripheral portion 31 of the lower mold half has an annular recess 32 which is of a size to receive the portion 30 and which has a tapered shoulder 33 that fits and engages the tapered inner surface of the portion 30 when the mold is closed. As shown herein, the bottom surface of the upper mold half and the upper surface of the lower mold half are flat and fit together in a flat horizontal plane at the parting line 28.

The two mold halves form a toroidal mold cavity 37 with an inner shaping surface of a predetermined configuration for shaping the rubber of the tire. Tread forming inserts 34 and 35 are mounted in the mold halves to shape the tread portion of the tire. They may be provided with vent passages (not shown). As shown they have inclined inner surfaces 38 and 39 for shaping the shoulder portions of the tire. The surface 38 and the curved inner surface 40 of the upper annular mold portion 41 shape one side of the tire, and the surface 39 and the curved inner surface 42 of the lower annular mold portion 43 shape the opposite side of the tire.

In a conventional mold 25, the top surface 44 of the upper mold half 26 is flat and parallel to the flat horizontal bottom surface 45 of the lower mold half 27 and to the horizontal plane containing the parting line 28. Conventional vent passages extend through the mold portions 41 and 43 from the mold cavity 37 to the exterior of the mold, and other vents (not shown) may also be provided in the segments 34 and 35, if desired. As shown herein, the upper portion 41 of the mold half 26 has a series of narrow vent passages 46 extending from the curved inner surface 40 to the flat outer surface 44. The lower portion 43 of the mold half 27 has a series of similar vent passages 48 for removal of gases from the mold.

The structure of the tire mold 25 as described above is conventional, and it will be understood that the mold may have conventional means for positioning the bead portions of the tire. As shown the mold halves are provided with recesses 50 and 51 to receive conventional bead-positioning rings 52 and 53 similar to those of the mold shown in FIG. 1. These may be held in place by screws 54 and 55 spaced around the circumference.

In normal use of the tire mold 25 as for example in a conventional steam dome press of the type shown in FIG. 1 or as shown and described in any of U.S. Pat. Nos. 2,358,762; 2,775,789 or 3,170,191, the upper mold half 26 engaging twelve radial ribs 36 of the bolster 10, is rigidly connected by screws 58 to the movable upper portion of the press (i.e. bolster 10) and the lower mold half 27 resting on twelve narrow radial supporting bars 59 is rigidly connected to the fixed lower portion of the press. The flat upper and lower surfaces 44 and 45 are thus held in place and clamped in position when the mold is closed during the shaping and vulcanizing operation. The radial ribs 36 and the radial bars 59 may be narrow and arranged like the corresponding radial ribs 70 (FIG. 4) and radial bars 37 (FIG. 7) of U.S. Pat. No. 2,358,762.

The mold is heated internally by steam or heated water in the curing bladder (i.e., a bag similar to diaphragm 18) and externally by steam in the steam dome which may have a pressure of 70 to 75 psig. The pressure limitations dictated by safety considerations limit the steam pressure in the dome and also the internal water pressure. Limitations on steam pressure limit the curing temperature and may require curing times 5 to 10 percent longer than desired.

The present invention involves a modification of the mode of heating wherein the dome stream may be eliminated and the tire mold is modified to incorporate an integral heat exchanger H which is heated by steam and is capable of safely handing a high pressure, such as 200 to 300 psig.

Figure 2:
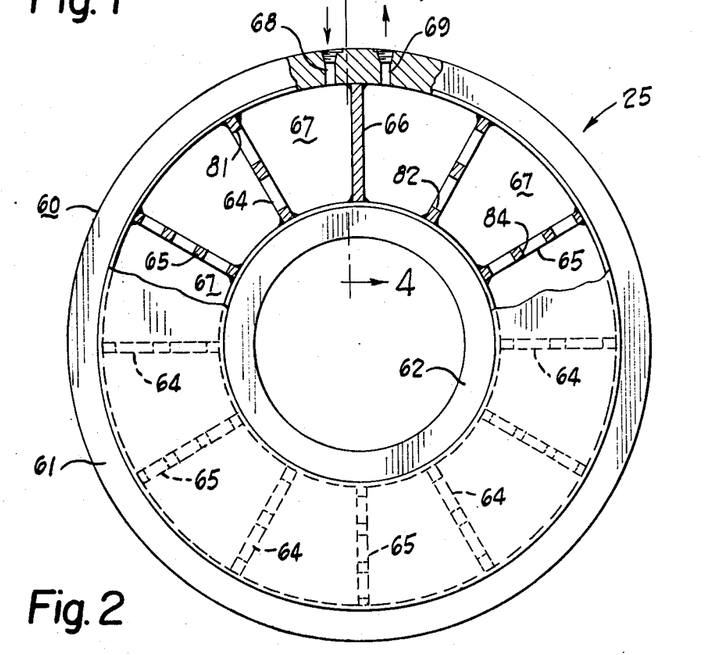
FIG. 2 is a plan view of a reduced scale illustrating a tire mold assembly for the press of FIG. 1 which has been modified in accordance with the present invention.

The apparatus H comprises upper and lower heat exchangers 60 and 70 of essentially the same construction providing closed steam jackets at the top and bottom of the tire mold 25. The heat exchanger 60 has outer and inner rings 61 and 62 of rectangular cross section, a flat annular plate or disc 63, and a series of radial supporting bars 64 and 65 of rectangular shape providing spacers of uniform width which are regularly spaced around the circumference of the mold as indicated in FIG. 2. One spacer 66 of the upper heat exchanger 60 has the same length and width as the other spacers 64 and 65 and serves as a partition in the annular steam chamber 67 between the inlet 68 and the outlet 69 to cause the steam to flow around the circumference of the mold.

The lower heat exchanger 70 is the same as the heat exchanger 60 described above, but of opposite hand. It has outer and inner rings 71 and 72, a flat disc 73 and regularly spaced radial supporting bars 64, 65 and 66 as previously described located in the annular steam chamber 77 formed by the members 71, 72 and 73. The bar 66 provides a closed partition between the steam inlet 78 and outlet (not shown). The various parts of the heat exchanger 70 are welded to each other and to the adjacent mold half in precisely the same way as the corresponding parts of the heat exchanger 60.

A description of the upper heat exchanger 60 and its connection to the upper mold half 26 will be sufficient to enable one to understand the details of the construction without duplicating the description as to the identical lower heat exchanger 70.

As herein shown each of the spacer bars 64 has two openings 81 and 82 adjacent the flat surface 44 to permit circumferential flow of steam in the chamber 67, and each of the spacer bars 65 has three openings 83, 84 and 85 for the same purpose located adjacent the plate 63. The partition 66 is free of such openings but has a pair of shallow drain slots 86 for removal of condensate.

Figure 3:
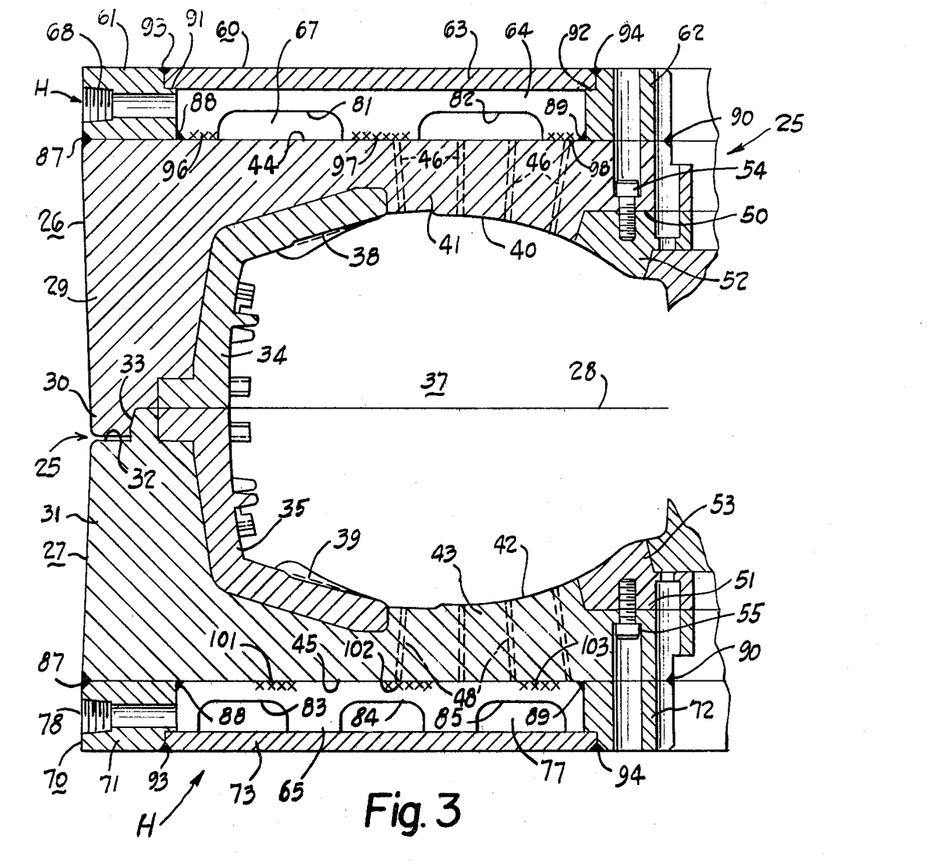
FIG. 3 is a partial vertical sectional view on a larger scale showing a piggyback heat exchanger mounted on the mold.

The heat exchanger 60 (or 70) is preferably of integral welded construction and sufficiently strong to withstand steam pressures in excess of 200 psig safely and without leakage of steam. As herein shown, the coaxial outer and inner metal rings 61 and 62 are integrally connected to the flat outer surface portions of the upper mold half 26 (at 44) by continuous circumferential welds 87, 88, 89 and 90. The two rings have annular recesses 91 and 92 of a size to receive the radially outer and radially inner portions of the disc 63 as shown in FIG. 3 and are welded to the disc by continuous circumferential welds 93 and 94 which extend completely around the ring to provide strong leakproof connections.

Each of the spacer bars 64, 65 and 66 is welded to the flat outer face 44 of the mold half 26 and may, if desired, be welded to the rings 61 and 62 and to the disc 63, but this is not necessary. As shown, each bar 64 is rigidly attached to the mold by short welds 96, 97 and 98 and each bar 65 is rigidly attached to the mold in a similar manner by short welds 101, 102 and 103. As indicated in the plan view of FIG. 2, twelve spacer bars are provided, and they are regularly spaced with a 30 degree space from one bar to the next (the same applies, of course, to the heat exchanger 70). The bars 64 and 65 are alternated so that each bar 64 is located between two bars 65 and is spaced 60 degrees from the next bar 64. The holes 81 to 85 of the spacer bars cause the steam to move in a tortuous path around the steam chamber 67 from the inlet 68 to the outlet 69. The resulting turbulence helps to provide more uniform heat transfer during the curing cycle.

The spacer bars 64 and 65 may be located so as not to block the vent passages (i.e. passages 46 and 48). However, if any of the welds block the vents, those vents are redrilled to eliminate the blockage.

The steam is admitted and the steam and condensate are removed from the steam chamber 67 by inlet and outlet passages extending radially through the ring 61. In the apparatus shown, these passages extend axially through ring 61 and the corresponding ring 71. The outlet passages are located to prevent accumulation of condensate in the steam chambers and permit continual drainage of condensate from the heat exchanger.

Steam may be periodically circulated around each heat exchanger, but flow for substantial periods of time is unnecessary. It is usually preferable to connect the steam inlet of the heat exchanger to a source of steam at the desired pressure and to maintain that pressure without closing the inlet. The outlet is connected to a conventional steam trap (not shown) which periodically opens to remove condensate and permit pulsed flow of steam from said source through the inlet to the heat exchanger and then closes to dead end the steam.

Steam dome presses are used for curing of relatively large or heavy duty tires including truck tires, farm tractor tires and tires for heavy construction vehicles with external diameters from 1 to 2 meters or more and tread widths from 25 to 60 cm or more. The present invention concerns modification of the molds for such tires where the mold thickness at the tire sidewall may be 3 to 5 cm or less.

The size and shape of the heat exchanger means H depends on the size or mass of the tire, the space limitations of the press, and other factors. Generally the heat exchanger 60 has a radial width W which is at least 4 times its depth and which is greater than the tread width of the tire. Such radial width is usually from 25 to 60 cm and such that the heat exchanger extends radially at least from the tread shoulder to the tire bead.

The annular steam chamber 67 of the heat exchanger 60 has a radial width preferably at least 5 times its average depth and preferably more than ⅔ the radial width W of the mold. The depth of the steam chamber may be from 1 cm to 4 cm or more. The depth of the heat exchanger may be limited to permit use of the mold in a dome press of minimum size and is preferably from 1.5 cm to 4 cm.

The present invention is concerned with modification of existing molds used in steam dome presses for manufacture of heavy duty truck tires, farm tractor tires and the like. It avoids machining of steam cavities into the molds which is undesirable for a number of reasons. Generally only marginal size steam chambers can be cut into such molds due to lack of material, and it is difficult to avoid cutting into existing vent passages. The cutting of such steam chambers would seriously weaken the molds and create the danger of failure due to stress cracking. Because the older molds are castings, they are likely to be porous and could provide a leaky steam chamber. The use of small steam chambers is impractical because of lack of adequate heat transfer. The present invention avoids these pitfalls and provides each mold half with a steam chamber which transfers heat to the tire from the bead region to the shoulder region of the tire in a very effective manner.

It will be understood, of course, that vulcanization of tires in jacketed molds has been known for at least several decades and that platen presses or steam-dome presses need not be used. Jacketed molds are disclosed, for example, in U.S. Pat. Nos. 1,984,768; 2,296,800, 2,340,191; 2,345,838; 2,374,099 and 3,770,858. The latter patent relates to a retread mold and indicates that the two mold halves may be heated by either steam or electric heating elements and that insulation may be provided to reduce heat loss.

Figure 4:
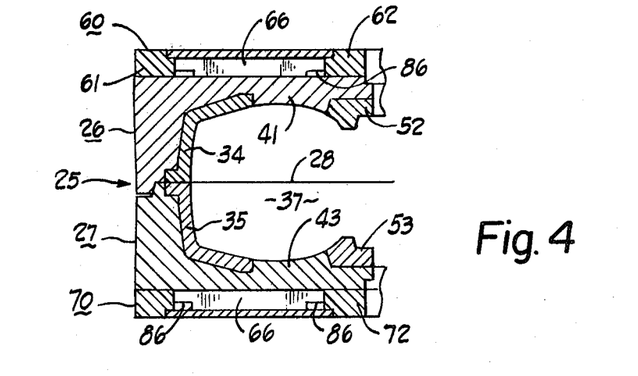
FIG. 4 is a partial vertical sectional view similar to FIG. 3 and taken on the line 4—4 of FIG. 2.
Figure 5:
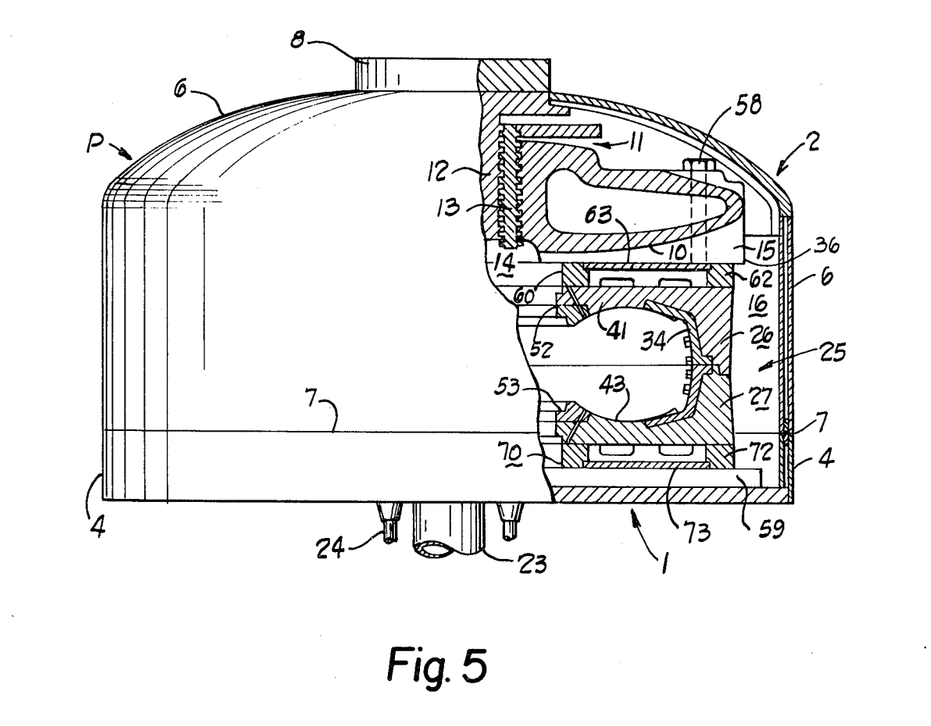
FIG. 5 is a partial side elevation with parts broken away and shown in section illustrating a steam dome press and mold operated in accordance with the invention.

FIG. 5 illustrates generally how the modified tire mold of FIG. 2 and 4 may be employed in a standard steam-dome press such as one of the general type disclosed in U.S. Pat. Nos. 2,358,762; 2,775,789 and 3,170,191. If desired the steam dome press may be modified to receive molds of greater height as by using a somewhat smaller bolster (10), but this is not necessary.

As indicated in FIG. 5, the upper mold half 26 and the associated heat exchanger 60 are located within the dome 6 of the press P and the lower mold half 27 and its heat exchanger 70 are supported on the bed of the press within the lower casing. The upper mold half 26 is rigidly mounted on the bolster 10 in engagement with the twelve ribs 36 by a series of bolts 58 and the lower mold half 27 is rigidly mounted on the twelve radial supports 59 as in the press disclosed in U.S. Pat. No. 2,358,762 or U.S. Pat. No. 3,170,191. Any suitable means may be provided to hold the mold halves in position.

The radial ribs 36 and radial bars 59 are narrow and minimize heat transfer through the metal because of the small area of contact with the mold. This small area minimizes the mass thermally coupled to the heat exchangers 60 and 70 so that the mold 25 can respond quickly to changes in steam temperature.

The diaphragm assembly 3 and other elements of the steam dome press of FIG. 5 may be the same as in the press P of FIG. 1 and as described in U.S. Pat. No. 3,170,191. Many of these elements are omitted in FIG. 5 for convenience of illustration since a showing of such common elements is not necessary for an understanding of the invention.

In the practice of the invention the green tire is positioned on the lower mold half 27 while the bladder 18 is collapsed, the press P is closed, and the bladder is then expanded by steam to force the tire against the shaping surfaces of the mold. The gases are then forced out the vent passages 46 and 48 of the heat exchangers 60 and 70 into the chambers 67 and 77. The hot mold and the heated curing bladder heat the tire for 1 to 6 mins or so until the rubber which has been forced or extruded into the vent passages is cured to the non-plastic state. During this time, steam may be provided in the bladder. Then steam at a temperature from 165° to 170° C. is admitted through steam inlets 68 and 78 to the steam chambers 67 and 77 and caused to circulate around the mold.

The steam inlets are kept open and maintained in communication with a suitable source of steam at the desired pressure. The flow of steam from the outlets is preferably controlled by a conventional steam trap to dead end the steam and periodically drain off the condensate while allowing pulsed flow of steam through the inlets. Various other systems may also be employed.

It is usually preferable to omit dome steam and to employ the maximum safe internal water pressure in the curing bladder during the vulcanization of the tire, if water is used in the bladder. The internal water pressure is preferably in the range from 280 to 400 psig. Steam may be employed in the bladder during part or all of the curing cycle. The steam pressure usually does not exceed 250 psig.

The modified mold of the present invention may be used for curing pneumatic rubber tires of various types including those with weights less than 20 kilograms but is usually used in connection with tires of greater mass, such as heavy duty truck tires or farm tractor tires.

The invention may, for example, be applied to curing of conventional tread and carcass compositions as are normally used in truck or passenger car tires and which contain the usual diene rubbers, fillers, antidegradants, extenders and curing agents. The rubber composition for the tire usually contains 100 parts by weight of a diene rubber, such as natural rubber (NR), polyisoprene (IR), polybutadiene (BR), styrene-butadiene rubber (SBR), or blends thereof, 50 to 70 parts by weight of a reinforcing carbon black, at least 5 parts of an oily plasticizer or extender, a small amount of an antioxidant, 2 to 5 parts of zinc oxide, 1 to 3 parts of a fatty acid, such as stearic acid, 0.5 to 4 parts of sulfur, 0.5 to 2 parts of an accelerator, and small amounts of other compounding ingredients, but the amounts of ingredients and the specific compositions may vary considerably as is well known in the art. Delayed action sulfenamide accelerators are commonly used. It is usually preferable to employ accelerated sulfur vulcanization but other curing systems can be used.

The invention applies to vulcanization of conventional tire tread and carcass compositions of various types such as those disclosed in the following publications: Vanderbilt Rubber Handbook, pgs 417–424 (1958); Rubber Journal, pgs 54–64 (Apr. 1967); Chemical Technology, pg 480 (1972); and Rubber Chem. Technol., Vol 47, 216 (1974) and Vol 51, 819 (1978).

For example, the present invention may be employed for curing of a conventional 10.00×20 heavy duty truck tire which is normally cured for 50 minutes in a steam dome press with external dome steam pressure of about 75 psig (about 160° C.) and with circulating hot water in the curing bladder maintained for 45 to 50 minutes at a temperature of about 185° C. and a pressure in excess of 280 psig. In the practice of the present invention, the same tire with exactly the same rubber compositions (for example, when using a tread composition containing a 50:50 blend of natural rubber and SBR rubber) may be cured in the same tire mold (modified with the added heat exchangers of this invention) and in the same steam dome press in much less time using steam in the heat exchangers at a temperature of 170° C. and the same 185° C. circulating hot water as before maintained at the same high pressure. If the tire is cured in this manner for 45 minutes, for example, according to this invention it has essentially the same high quality as the same tire cured for 50 minutes in the conventional manner as above. If the internal water pressure in the curing bladder is increased more than 10 percent while omitting dome steam, the quality of the tire may be significantly improved.

If in the example above, the steam in the heat exchangers (i.e., 60 and 70) is maintained at a higher temperature, such as 175° C., throughout the cure in the mold, the cure time can be reduced even more. The maximum temperature which can be used without reducing tire quality depends on the types of rubber compositions used in the various parts of the tire and other factors.

Tire quality can often be improved by varying the steam temperature and pressure during the curing cycle. In some cases it may become desirable to employ steam temperatures of 170° C. to about 180° C. or higher for brief periods of time.

In one preferred embodiment of the invention steam is supplied to the heat exchangers 60 and 70 at pressures from 20 to 250 psig which are varied during each curing cycle in the mold to provide a predetermined mold temperature profile. This can be done in an attempt to approach the ideal or most practical profiled heating curve and preferably involves substantial pressure changes of at least 40 psi. In this embodiment steam at a pressure of 200 to 250 psig can, for example, be used for brief periods such as 3 to 5 minutes to heat the mold rapidly. The mold can be cooled near the end of the curing cycle to help reduce overcuring of outer portions of the tire by use of cooling fluid, such as low temperature steam or possibly water.

High temperature vulcanization significantly reduces cure time and the cost of manufacture of tires and is commercially desirable provided that the proper compounding ingredients are employed (*Rubber Chem. Technol.* 52, 725-734, 1979).

Generally synthetic elastomers can be cured at a higher temperature than natural rubber. Truck tire treads of substantial thickness preferably employ a substantial amount of natural rubber to reduce heat buildup but all-synthetic treads are common. Most truck tires employ blends of natural rubber and synthetic diene rubbers, such as BR and oil-extended SBR rubber. Many of these can be cured at relatively high temperatures of 165° C. and above without loss of quality, and improvements in the compositions make it feasible to employ substantially higher temperatures to minimize the cure time in the mold.

The modified tire molds of the present invention are particularly useful because of their versatility. They do not interfere with operation of the steam dome press and can be used with or without dome steam. They can be used to increase the strength of the molds and the permissible internal pressures applied thereto. They do not interfere with heating of radially outer portions of the tire mold by dome steam or auxiliary steam chambers at the periphery of the mold.

The heat exchangers of this invention do not interfere with venting of the molds even though the steam chambers are in communication with the vent passages. The arrangement with respect to the vents can be advantageous in controlling the length of the extruded rubber in the vent passages, in speeding up the cure of such rubber extrusions, and/or in removing them from the vent passages.

I claim:

1. In a press of the steam-dome type for shaping and curing pneumatic rubber tires, said press having a fixed bottom assembly including a lower casing and a lower mold half and a movable top assembly including an upper mold half, an adjustable bolster, and an upper casing which fits the lower casing to form a seal and to provide a closed steam chamber surrounding the platen and the two mold halves, said mold halves fitting together to form a generally toroidal mold cavity and having a multiplicity of vent passages extending from said cavity to the steam chamber, and means for supplying high pressure steam to said steam chamber, the improvement which comprises a heat exchanger having an upper section located between said supporting platen and the upper surface of the upper mold half and a lower section located between the base portion of the press and the lower surface of the lower mold half, each section comprising a flat outer plate parallel to the outer face of the associated mold half and spaced therefrom by a series of narrow spacers to provide a shallow circumferential steam chamber in communication with said vent passages, and means for supplying high-pressure steam to said chamber to effect curing of a tire in the mold cavity.

2. A steam dome press according to claim 1 having a diaphragm assembly including a curing bladder with upper and lower edge portions, clamping rings for gripping said edge portions, and means for expanding and retracting the bladder characterized in that each of said mold halves is annular with a central opening to receive said diaphragm assembly, and said heat exchanger comprises flat annular plates and narrow radial spacers welded to the mold halves and to the annular plates at circumferentially spaced locations.

3. In a steam-dome press for shaping and curing pneumatic rubber tires having a lower casing and a domed upper casing which fit together to provide a closed steam chamber when the press is closed, a mold assembly having an upper mold half and a lower mold half which fit together to form a generally toroidal mold cavity and which have a series of vent passages extending outwardly from said mold cavity, and a heat exchanger on the outer face of each mold half comprising a flat outer plate parallel to said outer face and spaced therefrom by a series of narrow spacers to provide a circumferential steam chamber in communication with said vent passages, each heat exchanger being integrally connected to the mold halves to provide a flat shell with a height from 1.5 to 4 centimeters such that said mold and the attached heat exchangers are of a size to be received in said closed steam chamber.

4. A process for shaping and curing pneumatic rubber tires in a steam dome press containing upper and lower rigid metal mold halves fitting together to form a generally toroidal mold cavity and having a multiplicity of vent passages extending from the mold cavity, said process comprising providing heat exchanger means covering the outer faces of the mold halves and extending radially from the bead portion to the shoulder of a tire being cured in the mold cavity, said means providing an annular steam chamber of narrow cross section at the outer surface of each mold half in communication with said vent passages, placing a green tire in said mold cavity between the mold halves, heating the tire while applying pressure to the internal surface thereof to force gases through the vent passages to said steam chamber and to cause extrusion of rubber into said passages, partially vulcanizing the rubber in said passages, thereafter introducing steam into said steam chambers to heat the mold halves to a temperature of at least about 165° C., vulcanizing the tire while heating the interior thereof with heated water at a temperature of at least 165° C., and applying an internal water pressure of at least about 300 psig during said vulcanization.

5. A process according to claim 4 wherein the steam supplied to said steam chambers has a pressure from 20 to 250 psig which is varied during each curing cycle to provide a predetermined mold temperature profile, the change in steam pressure in each of said chambers during the curing cycle being at least 40 psi.

* * * * *